United States Patent [19]

Fluck

[11] Patent Number: 5,383,761
[45] Date of Patent: Jan. 24, 1995

[54] APPARATUS FOR SELECTIVELY SEPARATING ARTICLES FROM A STACK USING WHEEL MOUNTED PUSHERS

[75] Inventor: René Fluck, Schleitheim, Switzerland

[73] Assignee: SIG Schweizerische Industrie-Gesellschaft, Neuhausen am Rheinfall, Switzerland

[21] Appl. No.: 136,003

[22] Filed: Oct. 14, 1993

[30] Foreign Application Priority Data

Oct. 14, 1992 [CH] Switzerland .................... 3211/92

[51] Int. Cl.⁶ ............................................. B65G 59/06
[52] U.S. Cl. ................................. 414/798.9; 198/370; 414/797.7
[58] Field of Search ................... 414/798.9, 797.7; 198/370

[56] References Cited

U.S. PATENT DOCUMENTS

| | | | |
|---|---|---|---|
| 3,799,322 | 3/1974 | Van Linder et al. | 414/798.9 X |
| 4,209,277 | 6/1980 | Micucci et al. | 414/798.9 |
| 4,740,129 | 4/1988 | Sponseller | 414/798.9 |
| 4,822,234 | 4/1989 | Johnson et al. | 414/798.9 |

FOREIGN PATENT DOCUMENTS 2198711  6/1988  United Kingdom ............. 414/798.9

*Primary Examiner*—William Grant
*Attorney, Agent, or Firm*—Spencer, Frank & Schneider

[57] ABSTRACT

An apparatus for separating and sequentially conveying articles from an article stack includes an article accumulator in which the article stack is formed, a wheel, and a plurality of article pushers mounted on the wheel. Each article pusher has an article pushing face for pushing the article out of the article accumulator and is movable relative to the wheel into a first and a second position. In the first position the article pushing face is sufficiently close to the accumulator to abut and carry an article as the pusher passes by the accumulator and in the second position the article pushing face is sufficiently remote from the accumulator to move past the stack without abutting an article as the article pusher passes by the accumulator. Further, a control device moves selected article pushers into the second position prior to reaching the accumulator. A device resets the article pushers into the first position after having passed the accumulator. There is further provided an article ejecting device for moving each article away from the wheel after the article has been carried from the accumulator.

13 Claims, 4 Drawing Sheets

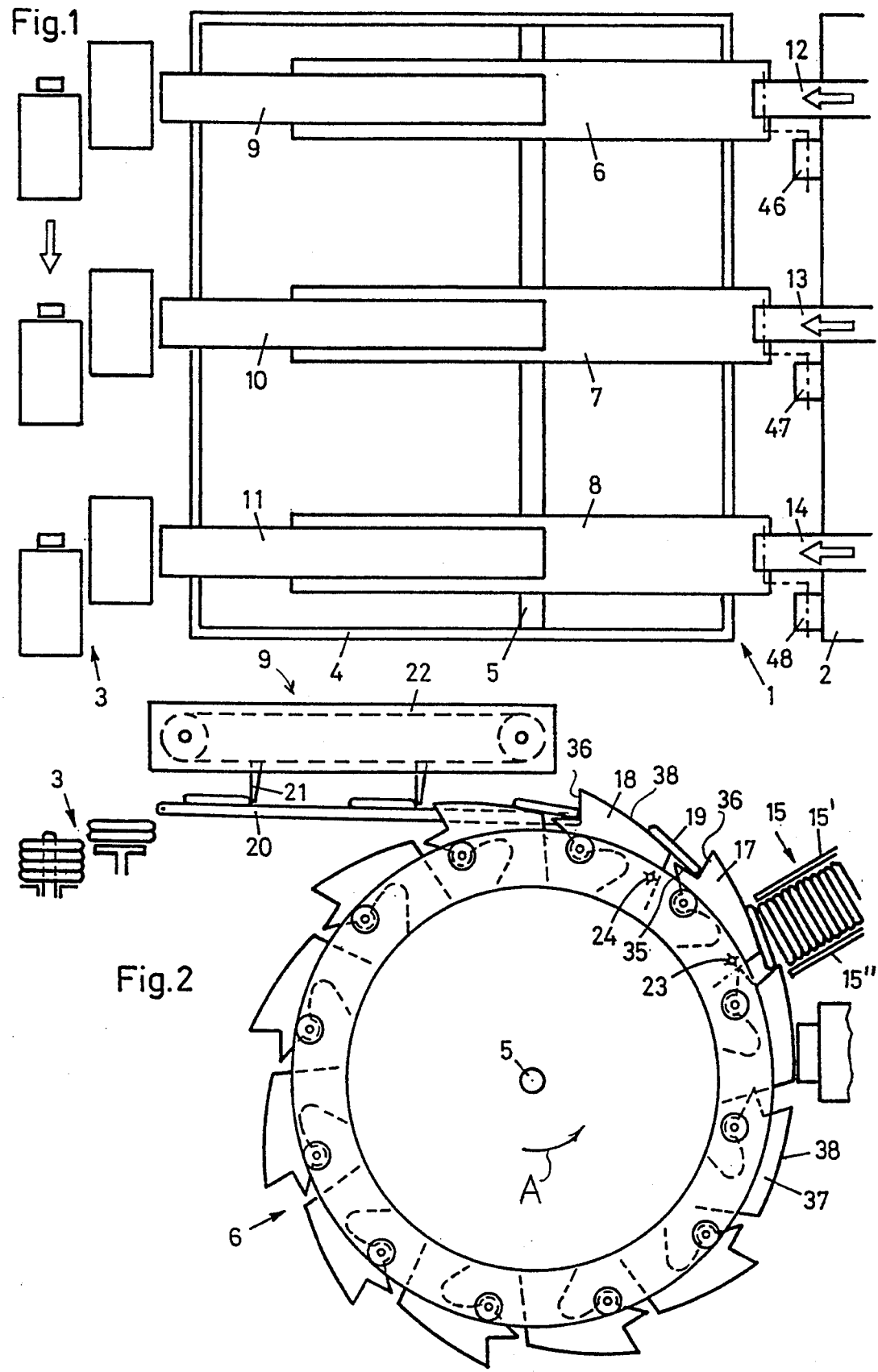

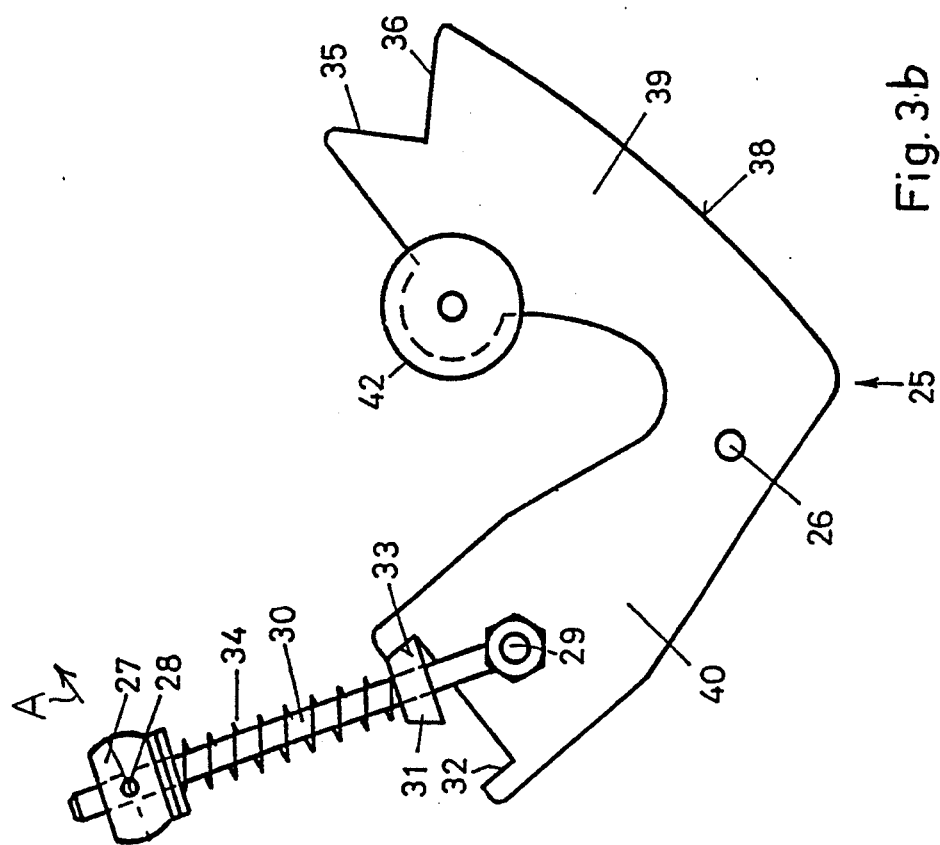
Fig. 3.b
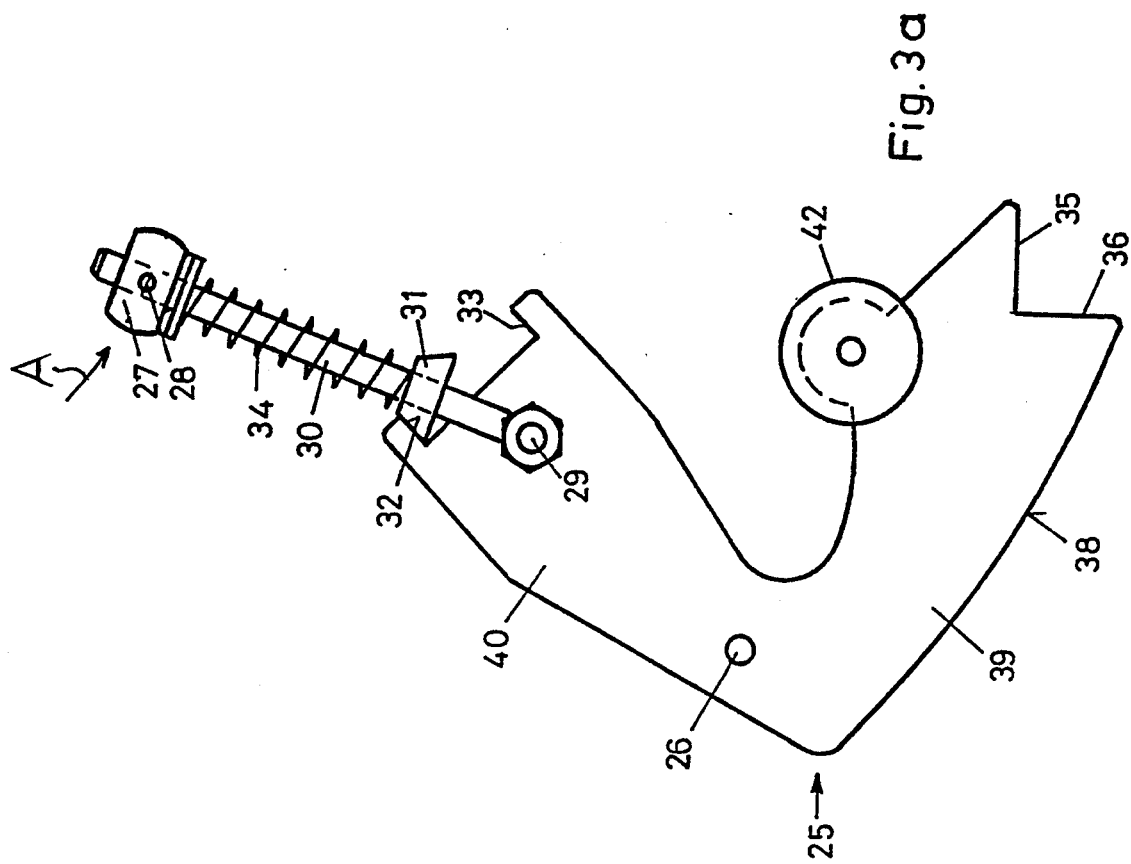
Fig. 3.a

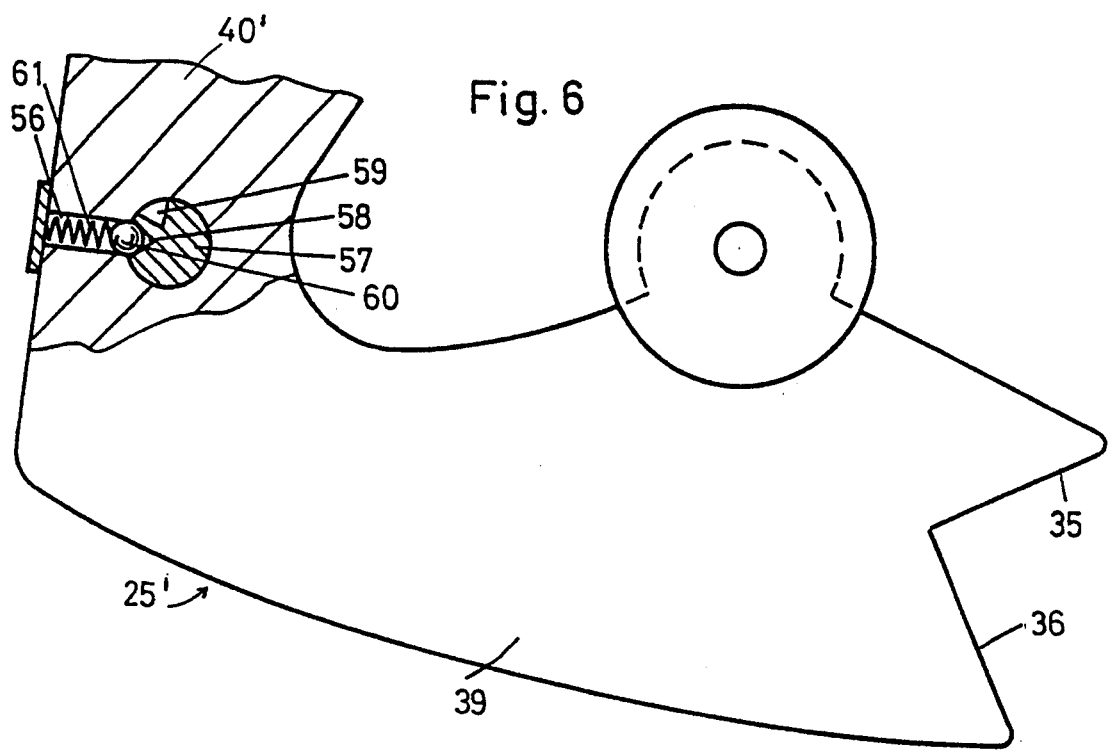
Fig. 6
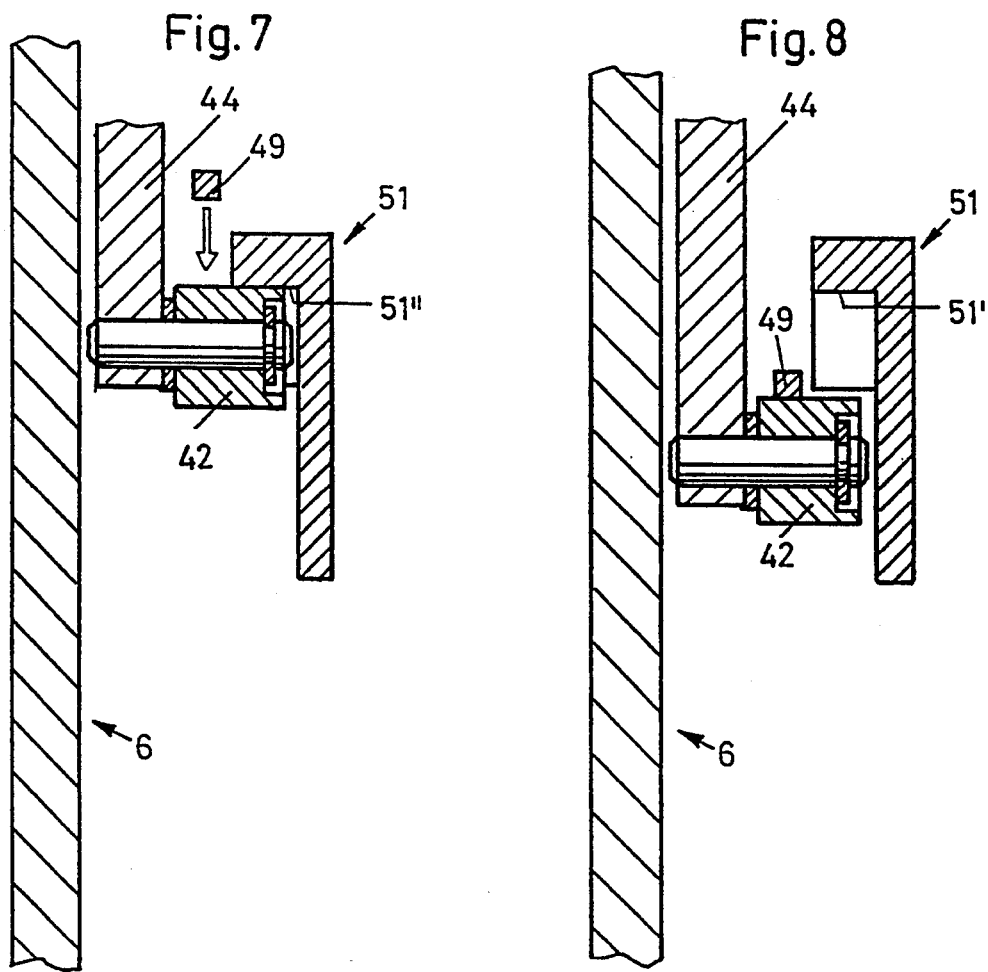
Fig. 7
Fig. 8

5,383,761

APPARATUS FOR SELECTIVELY SEPARATING ARTICLES FROM A STACK USING WHEEL MOUNTED PUSHERS

CROSS REFERENCE TO RELATED APPLICATION

This application claims the priority of Swiss Application No. 3211/92-5 filed Oct. 14, 1992, which is incorporated herein by reference.

BACKGROUND OF THE INVENTION

This invention relates to an apparatus for separating fiat articles, particularly confectionery items such as wafers or cookies which are advanced in a plurality of generally parallel spaced channels to respective separating devices of the apparatus and are conveyed therefrom to removal and collecting devices.

Known apparatus of the above-outlined type have the disadvantage that the articles handled thereby cannot be readily used in conjunction with the packing of articles which are preferably to be counted before packing.

SUMMARY OF THE INVENTION

It is an object of the invention to provide an improved apparatus of the above-outlined type which may be economically manufactured and with the aid of which counted articles may be relatively rapidly packaged.

This object and others to become apparent as the specification progresses, are accomplished by the invention, according to which, briefly stated, the apparatus for separating and sequentially conveying articles from an article stack includes an article accumulator in which the article stack is formed; a wheel; and a plurality of article pushers mounted on the wheel. Each article pusher has an article pushing face for pushing the article out of the article accumulator. Each article pusher is movable relative to the wheel into a first and a second position. In the first position the article pushing face is sufficiently close to the article accumulator to abut and carry an article as the article pusher passes by the article accumulator and in the second position the article pushing face is sufficiently remote from the article accumulator to move past the article stack without abutting an article as the article pusher passes by the article accumulator. Further, a control device moves selected article pushers into the second position prior to reaching the article accumulator. A device resets the article pushers into the first position after having passed the article accumulator. There is further provided an article ejecting device for moving each article away from the wheel after the article has been carried from the article accumulator.

BRIEF DESCRIPTION OF THE DRAWING

FIG. 1 is a schematic top plan view of the basic construction of the apparatus according to the invention.

FIG. 2 is a schematic side elevational view of the basic construction of the apparatus according to the invention.

FIGS. 3a and 3b are schematic side elevational views of a preferred embodiment of an article pusher forming part of the invention and shown in two different pivotal positions.

FIG. 6 is a schematic, partially sectional side elevational view of another preferred embodiment of an article pusher.

FIG. 7 is a sectional view taken along lines VII—VII of FIG. 4.

FIG. 8 is a sectional view taken along lines VIII—VIII of FIG. 5.

DESCRIPTION OF THE PREFERRED EMBODIMENTS

Figure 4:
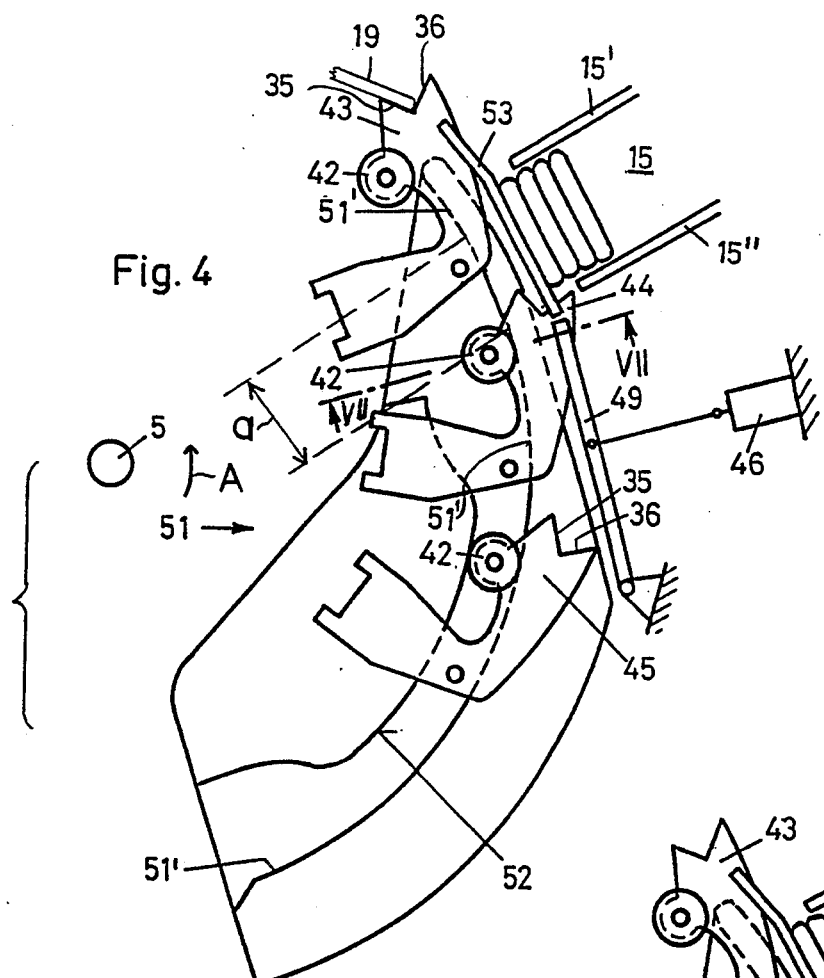
FIG. 4 is a fragmentary schematic side elevational view of the construction according to the invention showing all three illustrated article pushers in a "pushing" working position.

Turning to FIG. 1, the article separating apparatus generally designated at 1 according to the invention is positioned between an article supply apparatus 2 and a transverse transporting apparatus 3. The apparatuses 2 and 3 may be of conventional construction.

The apparatus 1 has a machine frame 4 and three article separating groups each having a respective article advancing wheel 6, 7 and 8 and a respective article ejecting device 9, 10 and 11 which removes articles from the respective wheel. The wheels 6, 7 and 8 are mounted for rotation on a common horizontal shaft 5. It is feasible, however, to support each wheel individually. For simplifying the drawing only three article separating groups are shown; in practice a significantly greater number of groups (for example, ten) may be present. Accordingly, the illustrated article supply apparatus 2 is shown to have only three supply devices 12, 13 and 14, respectively; their terminal zones are situated at a level slightly above the shaft 5.

FIG. 2 illustrates one of the identically structured article separating groups. The group shown in FIG. 2 is associated with the article supply device 12 terminating in an article accumulating chute 15 having chute walls 15', 15". The article advancing wheel 6 has twelve peripherally arranged pushers, each being individually pivotal about an axis oriented parallel to the shaft 5. Each article, such as article 19, is advanced by the rotation of the wheel 6 while supported on two adjoining article pushers, such as 17 and 18. The articles transported by the article advancing wheel 6 from the article accumulating chute 15 are advanced to the ejecting device 9 having a surface 20 onto which the articles are pushed from the wheel 6 by means of ejector fingers 21 moved by a finger advancing device 22 of the ejecting device 9. The latter advances the articles to the transverse conveyor device 3. In the illustration shown in FIG. 2, the wheel 6, together with the twelve pivotal article pushers moves counterclockwise in the direction A. The pushers are pivotally secured to the wheel 6 at their rearward portion, to be swingable about pivots secured at the peripheral edge of the wheel 6. Such pivots are designated at 23 and 24 to provide for the swinging motion of the pushers 17 and 18, respectively.

Turning to FIGS. 3a and 3b, there is illustrated in structural detail an article pusher designated at 25 and shown in two different working positions as will be explained below. The article pusher, also designated at 17, 18, 19 and 37 in FIG. 2 and at 43, 44 and 45 in FIGS. 4 and 5 may be pivotally mounted on the article advancing wheel 6 (not shown in FIG. 3), for example, in the bottom face of a lateral depression thereof. All the article pushers carried by the wheel 6 are of identical configuration; they are substantially flat, generally L-shaped parts which thus have two legs 39 and 40 oriented at an angle (for example, 90°) to one another. The article pusher 25 is pivotally mounted on the wheel 6 by means of a pivot pin 26 which corresponds to the pivots 23 and 24 in FIG. 2. The pivot pin 26 is situated approximately in the connecting zone of the two angularly arranged legs 39, 40 of the article pusher 25. The article pusher 25 has a guide 27 pivotally mounted on the wheel 6 by means of a pivot 28. A pin 30 slidably passes through the guide 27 and has an end which is remote from the pivot pin 28 and which is pivotally mounted on the article pusher 25 by means of a pivot 29 located in an end zone of the leg 40. The pin 30 is provided with a stop 31 cooperating with two spaced shoulders 32 and 33 provided at the end of the leg 40. Thus, dependent upon the angular (pivoted) position of the article pusher 25, the stop 31 engages either the shoulder 32 (FIG. 3a) or the shoulder 33 (FIG. 3b).

The pin 30 is surrounded by a coil spring 34 which urges the pin 30 away from the guide 27 to thus ensure that the distance between the pivot pins 28 and 29 is maintained as large as possible until the abutment 31 engages either the shoulder 32 or the shoulder 33. As a result of this construction, only the two over-the-center end positions of the pivotal motion of the pin 30 are stable positions, that is, the article pusher 25 may not assume an intermediate position but will pivot into either one of the two end positions.

In FIG. 3a the article pusher 25 is shown in its "pushing" end position in which the abutment 31 is in contact with the shoulder 32 so that the pivot pin 29 is situated to the right of a plane containing the pivotal axes of pivot pins 26 and 28. In FIG. 3b, on the other hand, the article pusher 25 is situated in the "non-pushing" end position in which the abutment 31 is in contact with the shoulder 33 so that the axis of the pivot pin 29 is situated to the left of the plane which contains the axes of the pivot pins 26 and 28. The meaning and significance of the "pushing" and "non-pushing" positions of the article pusher will be explained later.

The free end of the leg 39 of the article pusher 25 has a notch-like recess defined by an article-supporting face 35 and an article-pushing face 36 which are oriented at an angle of approximately 90° to one another. The article pusher 25 which, as noted earlier, is shown in its "pushing" position in FIG. 3a, has its article-supporting face 35 oriented substantially tangentially to the circumference of the wheel 6, whereas the article-pushing face 36 is substantially radial to the wheel 6. In the illustration of FIG. 2, all article pushers, with the exception of the article pusher 37 are in the "pushing" position in which an article 19 lies, with its trailing edge zone, in the recess formed by faces 35, 36 as shown, for example, for the article pusher 17 in FIG. 2.

In contrast, the article pusher 37 of FIG. 2, as well as the article pusher 25 of FIG. 3b is illustrated in a "non-pushing" working position in which an outer, slightly curved article-supporting surface 38 of the article pusher extends substantially parallel to the periphery of the wheel 6 and its article-pushing face 36 is in a withdrawn, inoperative position. Thus, in the "non-pushing" position of the article pusher the center of curvature of the outer surface 38 lies essentially on the axis of the wheel shaft 5. The distance between the ends of the walls 15', 15" (FIG. 2) of the article storing chutes 15 defines the channel height. Preferably, the article-supporting surface 38 has a length of 0.5 to 2 times greater than the channel height.

Opposite the outer surface 38, the leg 39 of the article pusher carries a follower roller 42 whose function will now be explained with particular reference to FIGS. 4, 5, 7 and 8 in which three article pushers 43, 44 and 45 are shown that are structured identically to the article pusher 25 illustrated in FIGS. 3a and 3b. All three article pushers of FIG. 4 are in the "pushing" position so that upon rotation of the wheel 6 in the direction A, the article-pushing faces 36 engage and push forward an article 19. Such a condition is shown in FIG. 2 where a trailing part of an article 19 nests in the recess formed of faces 35, 36 of the article pusher 17, while a leading part of the same article 19 lies on the outer surface 38 of the article pusher 18.

With each transport wheel 6 there is associated a separate control device 46 (FIGS. 1, 4 and 5) and 47, 48 (FIG. 1). Each control device operates independently for moving a lever 49 (FIGS. 4 and 5) which, when in the activated position shown in FIGS. 5 and 8, acts as a cam track for the respective roller 42, forcing the associated article pusher (44 in FIG. 5) to pivot into the "non-pushing" position just prior to reaching the article accumulating chute 15. In FIGS. 4 and 7 the lever 49 is in its idling position, allowing the article pushers to remain in the "pushing" position as they pass by the chute 15. It is to be understood that the lever 49 moves in a plane different from the article pusher, that is, in the same plane in which the roller 42 lies. In this plane there is further arranged a stationarily supported cam track 51 which has cam track faces 52 and 51' forming a cam track groove in which the follower roller 42 travels to be pressed outwardly, thus placing each article pusher into a "pushing" position prior to reaching the chute 15 as the wheel 6 rotates. The cam track face 52 is discontinued prior to the zone of the chute 15 to allow operation of the cam track lever 49. The cam track face 51' further has a linear cam track face portion of a length a which extends in the zone of the chute 15 and which (if the lever 49 is in the idling position of FIG. 4) presses the roller 42 somewhat inwardly and guides it linearly so that the article-pushing face 36 of the article pusher advances the article in a gentle manner approximately in a linear direction of motion out of the storage chute 15. In the description which follows, the operation of the above-described apparatus will be set forth.

The article supply devices 12, 13, 14 (FIG. 1) form channels through which flat-lying, superposed, disc or wafer-shaped articles, for example, flat confectionery items are advanced in respective rows. The article separating groups each formed of a respective article advancing wheel 6, 7, 8 and respective ejecting devices 9, 10, 11 operate as separating devices for the purpose of separating the articles from one another. After such separation the articles are advanced to the respective transverse conveying devices 3 which form removal and collecting devices. It is a salient feature of the invention that from the consecutive sequence of advancing articles by the wheel 6, at desired times articles may be omitted if, for example, such an omission is warranted based on a process of counting the articles. The counting process is performed preferably by electronic means and does not form part of the invention. The control devices 46 are actuated only if upon counting of the articles which are to be packaged, an article should omitted, that is, it should not be advanced by the respective wheel 6, 7 or 8.

During normal article advancing operation each consecutive article pusher carried by the wheel 6 (FIG. 2) removes the bottom article from the accumulating chute 15 and pushes it towards the associated ejecting device 9. The articles are prevented from dropping out of the chute 15 by two parallel extending, spaced rails 53, of which one visible in FIGS. 4 and 5. Thus, the rails 53 are so arranged that they straddle the article pusher as it passes in the spacing between the two rails 53.

During normal operation, each article pusher is in its "pushing" position as it passes under the chute 15. To ensure such a position, the cam track lever 49 is in its idle position shown in FIG. 4 to thus ensure that all article pushers remain in the "pushing" position into which they were brought earlier by the cam track groove 52, 51'. Thus, as an article pusher enters the space occupied by the stack of articles retained by the rails 53, the article-pushing face 36 of the article pusher engages the lowermost article then resting on the rail 53 and moves it out of the chute 15. While doing so, the frontal part of the article 19 will lie on the immediately adjoining, leading article pusher and thus each article 19 will be carried in a circular path by two adjoining article pushers into the above-lying operational zone of the article ejecting device 9.

Figure 5:
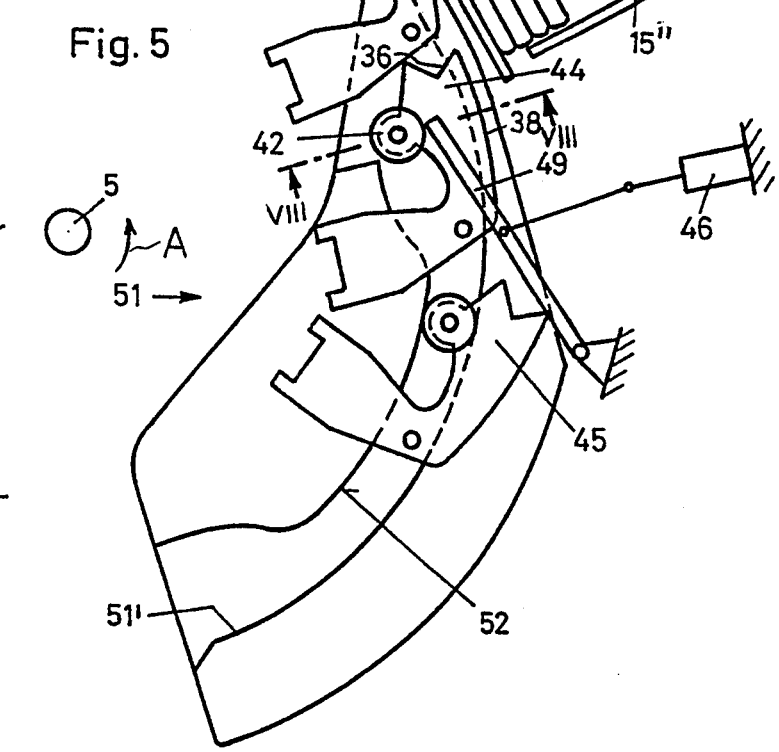
FIG. 5 is a view similar to FIG. 4, showing two of the three article pushers in a "pushing" working position and one article pusher in a "non-pushing" working position.

If during the article separating process it is desired that an article (or several articles) be skipped from the continuous article sequence carried by the respective wheels 6, 7 or 8 to the respective ejecting devices 9, 10 and 11, the respective control device 46 is actuated to move the cam track lever 49 from its idle position in FIG. 4 into its working position in FIG. 5. As a result, after such motion of the lever 49 has occurred, the roller 42 of the first article pusher arriving in the operational zone of the lever 49 will be pushed away from the cam track face 51' and thus the article pusher will be pivoted counterclockwise (as viewed in FIG. 5) into the "non-pushing" position as seen for the article pusher 44 in FIG. 5. In this position the article pushing face 36 of the article pusher is depressed to such an extent that it will not engage the lowermost article of the stack in the chute 15 and thus the article pusher will pass underneath the chute 15 without picking up an article. Because of the earlier-described bistable pivotal position of each article pusher, the article pusher 44 will remain in its "non-pushing" state until an external force will pivot it back into the "pushing" position. Such a force will be exerted on the article pusher as it again enters the cam track groove 52, 51' ahead of the chute 15.

The first article pusher which will reach the operational zone of the lever 49 after the latter has been returned from the operational position of FIG. 5 into the idle position of FIG. 4 will be allowed to remain in the "pushing" position, that is, the roller 42 of that article pusher will continue to travel on the cam track face 51'. Instead of the cam track groove 52, 51' permanent magnets or electromagnets may be used to urge the article pushers into their "pushing" position.

In the embodiment shown in FIG. 6, the radial leg 40' of the article pusher 25' has a transverse opening 56 in the zone of a pivot pin 57 which pivotally mounts the article pusher on the wheel 6. The pivot pin 57 has two depressions 58 and 59 arranged at an angle to one another which corresponds exactly to the pivot angle of the article pusher 25'. For arresting the article pusher in the one or the other end position thereof, a ball 60, introduced into the opening 56 is seated in the one or the other depression 58 or 59 and is urged thereagainst by a compression spring 61 accommodated in the opening 56. In this embodiment the radial leg of the article pusher may be shorter than the other leg 39 thereof.

It will be understood that the above description of the present invention is susceptible to various modifications, changes and adaptations, and the same are intended to be comprehended within the meaning and range of equivalents of the appended claims.

What is claimed is:

1. An apparatus for separating and sequentially conveying articles from an article stack, comprising
   (a) an article accumulating means for forming the article stack therein;
   (b) an article advancing wheel supported for rotation about a wheel axis in an article advancing direction;
   (c) a plurality of spaced article pushers mounted on the wheel for circular travel therewith as a unit; a distance between said wheel and said article accumulating means being such that the article pushers sequentially pass by said article accumulating means upon rotation of said wheel; each said article pusher including an article pushing face for abutting an edge of an article in the article stack and pushing the article out of the article accumulating means and carrying the article from the article accumulating means as the wheel rotates;
   (d) mounting means for securing each article pusher to said wheel to allow each said article pusher to move relative to said wheel into a first and a second position; in said first position said article pushing face is sufficiently close to said article accumulating means to abut and carry an article from the article accumulating means as the article pusher passes by the article accumulating means upon rotation of the wheel and in said second position said article pushing face is sufficiently remote from said article accumulating means to move past the article stack without abutting an article as the article pusher passes by the article accumulating means upon rotation of the wheel;
   (e) control means for moving selected article pushers into said second position prior to reaching said article accumulating means as the wheel rotates;
   (f) resetting means for moving the selected article pushers into said first position after having passed said article accumulating means; and
   (g) article ejecting means for moving the articles away from said wheel after the article has been carried from the article accumulating means by the article pushers.

2. The apparatus as defined in claim 1, further comprising over-the-center means for providing two opposite stable end positions for each said article pusher; said stable end positions constituting said first and second positions.

3. The apparatus as defined in claim 2, wherein the pivot axis of each said article pusher is spaced from and is parallel to said wheel axis.

4. The apparatus as defined in claim 1, wherein said resetting means comprises
   (a) a follower roller mounted on each said article pusher; and
   (b) a stationary cam track supported adjacent said wheel; said follower roller of each said article pusher running on said stationary cam track and forcing each said article pusher to assume said first position prior to reaching an effective zone of said control means during rotation of said wheel.

5. The apparatus as defined in claim 1, wherein said mounting means comprises a pivot to provide for a pivotal motion of each said article pusher about a pivot axis into said first and second positions.

6. The apparatus as defined in claim 5, wherein each article pusher has first and second legs connected to one another to form a generally L-shaped member; said article pushing face being provided at a free end of said first leg.

7. The apparatus as defined in claim 6, further comprising an article supporting face at said free end of said first leg; said article supporting face adjoining said article pushing face at an inclination thereto to form a recess therewith to receive an edge portion of an article.

8. The apparatus as defined in claim 7, wherein said inclination has an angle of approximately 90°.

9. The apparatus as defined in claim 6, wherein said article pushers are flat members.

10. The apparatus as defined in claim 6, wherein each said article pusher has an outer surface having a circular curvature whose center lies on said wheel axis in said second position of the article pusher.

11. The apparatus as defined in claim 1, wherein said control means comprises (a) a follower roller mounted on each said article pusher;

(b) a cam track movably supported at a stationary location adjacent said wheel and having idle and working positions; in said idle position said cam track allowing the article pushers to retain said first position as the follower roller passes by said cam track upon rotation of the wheel and in said working position said cam track engages and depresses the follower roller of the article pushers for setting the article pushers into said second position; and (c) actuating means for moving said cam track into said idle position and said working position.

12. The apparatus as defined in claim 11, wherein said wheel has a periphery; said article pushers being mounted in a circumferential array along said periphery.

13. The apparatus as defined in claim 1, further comprising a follower roller mounted on each article pusher; and a stationary linear cam track disposed in a zone of said article accumulating means for guiding the roller in a linear path when the article pusher is in said first position to provide for a linear motion of the article pusher as the article pusher advances an article out of said article accumulating means.

* * * * *